(12) United States Patent
Bong

(10) Patent No.: US 6,708,938 B2
(45) Date of Patent: Mar. 23, 2004

(54) CUP HOLDER FOR AN AUTOMOBILE

(75) Inventor: Ha Kwon Bong, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/331,244

(22) Filed: Dec. 30, 2002

(65) Prior Publication Data

US 2004/0016858 A1 Jan. 29, 2004

(30) Foreign Application Priority Data

Jul. 24, 2002 (KR) .................................. 2002-0043501

(51) Int. Cl.⁷ ................................................. B60N 3/10
(52) U.S. Cl. ................................... 248/311.2; 224/926
(58) Field of Search ............................ 248/311.2, 314; 224/282, 542, 556, 926; 297/188.14, 188.19

(56) References Cited

U.S. PATENT DOCUMENTS

| | | | | |
|---|---|---|---|---|
| 2,831,647 A | * | 4/1958 | MacKay ................. | 248/205.3 |
| 5,505,516 A | * | 4/1996 | Spykerman et al. ..... | 248/311.2 |
| 5,634,621 A | * | 6/1997 | Jankovic ................. | 248/311.2 |
| 5,718,405 A | * | 2/1998 | Adachi ................... | 248/311.2 |
| 6,217,112 B1 | * | 4/2001 | Linsenmeier et al. ..... | 297/113 |
| 6,409,136 B1 | * | 6/2002 | Weiss et al. ............. | 248/311.2 |

* cited by examiner

*Primary Examiner*—Ramon O. Ramirez
*Assistant Examiner*—Jon Szumny
(74) *Attorney, Agent, or Firm*—Morgan Lewis & Bockius LLP

(57) ABSTRACT

A cup holder for use in an automobile. The cup holder is mounted in a console of the automobile. A jaw that serves to lift a cover for the cup holder is integrally formed at one side of an upper surface of the cover. In this cup holder, there is no necessity for employing additional guides in order to hold the beverage can or the beverage can. The cup holder is capable of independently receiving various sized articles with maintaining a good external appearance and it is convenient to use. When a user open a front cover among the total covers for opening or closing retaining grooves, there is no necessity for opening the back covers.

8 Claims, 4 Drawing Sheets

CUP HOLDER FOR AN AUTOMOBILE

FIELD OF THE INVENTION

The present invention relates to a cup holder for use in an automobile, and more particularly to a lower cost cup holder with fewer parts, simplified manufacturing, and enhanced appearance.

BACKGROUND OF THE INVENTION

Recently, there is a growing tendency that many citizens travel from place to place by automobile thanks to abundant living circumstances and good network of roads. When a person travels a long distance by automobile, he or she frequently drinks water, soft drinks or a cooling beverage within the automobile. For the convenience of driver, a holder for holding a beverage can or a beverage cup is frequently placed in a console of the automobile. The driver or a passenger of the automobile can drink water after holding the beverage can or the beverage cup in the holder. There are many cup holders such as a cover-type holder, an open-type holder and a shutter-type holder. The cover-type holder is frequently employed in medium-size passenger cars and large-size passenger cars. In this cover-type holder, a beverage cup or a beverage can is retained in the holder after opening one body type holder cover. However, problems associated with this holder are that the appearance of the holder is not good and the holder cover is open in order to retain the beverage cup or the beverage can.

The open-type holder is employed in small and medium-size passenger cars and recreation vehicles. In this open-type holder, a beverage cup or a beverage can is retained in a holder that does not have any cover and thereby it is always open. However, a problem associated with this holder is that articles having a relatively small volume or foreign substances may fall into the holder.

The shutter-type holder is employed in certain deluxe cars. However, a problem associated with this holder is that a driver or a passenger is inconvenienced during the use of the holder because he or she must open and close a shutter in order to hold the beverage cup or the beverage can in the holder.

Some techniques that employ a cover capable of selectively opening or closing an interior of the holder are also known. However, a drawback associated with these techniques is the necessity of employing a guide for holding the beverage cup or the beverage can. Another drawback is that appearance of the holder is not good during retaining of a small size can or cup in the holder. Another drawback is that the manufacturing cost of the holder is too costly owing to the complicate structure of the holder.

SUMMARY OF THE INVENTION

Embodiments of the present invention provide a cup holder for an automobile capable of reducing manufacturing cost due to a reduction in the number of parts employed in the cup holder and the number of process steps for manufacturing the cup holder. In embodiments of the invention, a housing is provided that is insertable into the center console to provide cup holders.

Preferably, the housing defines two cup-shaped recesses to receive cups. A plurality of covers is provided for the recesses. A first cover is mounted with a hinge to cover a first of the recesses. Two additional covers are hinged on a wall between the two recesses so as to be able to be moved back and forth to cover either recess. Preferably these two covers include a ring cover, with an open center such that the other cover can be positioned within the open center. The first cover also preferably includes a depression such that the second cover and ring cover can be received therein. The covers and recesses are arranged such that when closed, each cover is flush with the console to provide a pleasing appearance.

BRIEF DESCRIPTION OF THE DRAWINGS

Characteristics and advantages of the present invention will become more apparent by describing in detail preferred embodiments thereof with reference to the attached drawings, in which.

DETAILED DESCRIPTION OF THE INVENTION

Hereinafter, the cup holder for the automobile according preferred embodiments of the present invention will be explained in more detail with reference to the:accompanying drawings.

Figure 1:
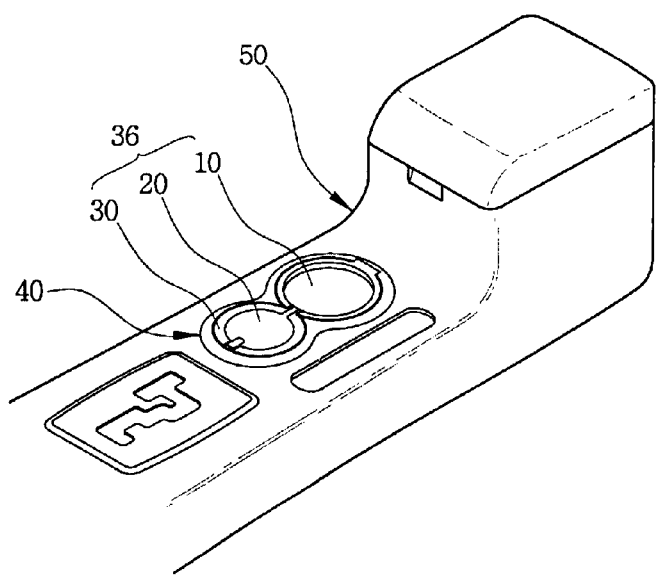
FIG. 1 is a perspective view of a console in which a cup holder according to a preferred embodiment of the present invention is mounted.
Figure 2:
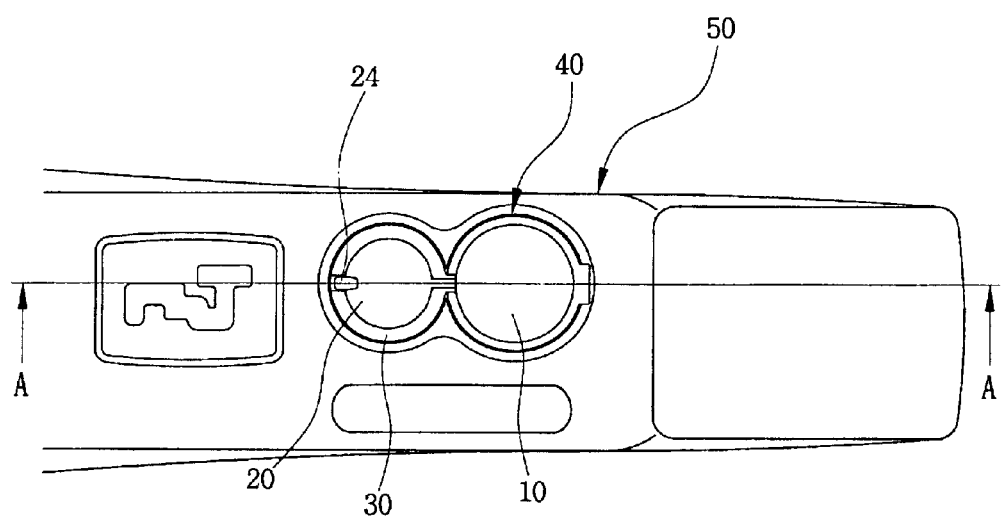
FIG. 2 is a top plan view of a console, illustrating a combined state of the cup holder and the console.
Figure 3:
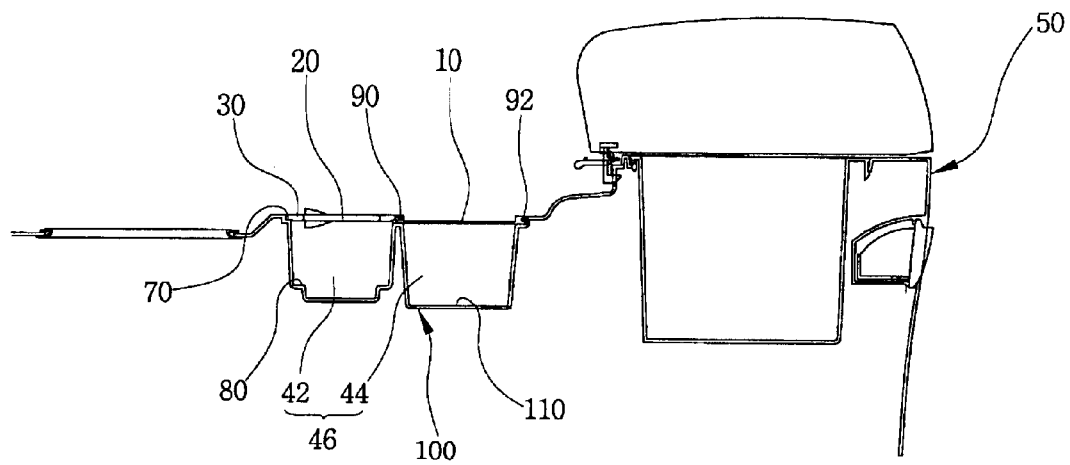
FIG. 3 is a sectional view taken along line A'—A' of FIG. 1.

As shown in FIG. 1, a cup holder 40 according to a preferred embodiment of the present invention is installed in a console 50 of an automobile. A pair of retaining recesses 46, which serve to hold a cup, bottle or can, are formed in the console 50, preferably via a housing 100. The retaining recesses 46 may be opened or closed by a plurality of covers 36. The first retaining recess 44 may be opened and closed by first and second covers 10, 20 and a ring cover 30, which are preferably integrally combined together. The second retaining recess 42 may be opened or closed by the second cover 20 and the ring cover 30.

The second cover 20 and the ring cover 30 are pivotally mounted to a front end of the first retaining recess 44 by a hinge mechanism 92, all of which are rotatably connected at a common axis of the hinge mechanism 92. The second cover 20 for opening and closing the second retaining recess 42 is placed concentrically inside the ring cover 30 for independent opening and closing of the second retaining recess 42.

A handle 24 which serves to lift the second cover 20 is integrally formed at one side of an upper surface of the second cover 20, and a handle receiving groove 34 is formed at one side of an upper surface of the ring cover 30. The handle 24 may be positioned in the handle-receiving groove 34 in a normal state.

Locking steps 70 are formed at upper ends of the retaining recesses 46 so that the plurality of covers 36 contact the locking steps 70 at their bottom surfaces, thereby upper surfaces of the plurality of covers 36 are level with an upper surface of the console. As a result, it is possible to prevent the plurality of covers 36 from being forcibly pushed into housing 100.

A supporting step 80 is formed at an inner lower portion of the second retaining recess 42 so that cups or cans having different diameters may be received in the second retaining recess 42. A cover-retaining depression 16 is formed at an upper portion of the first cover 10. When the second cover 20 and the ring cover 30 are open, they are inserted into the cover-retaining depression 16.

Figure 4:
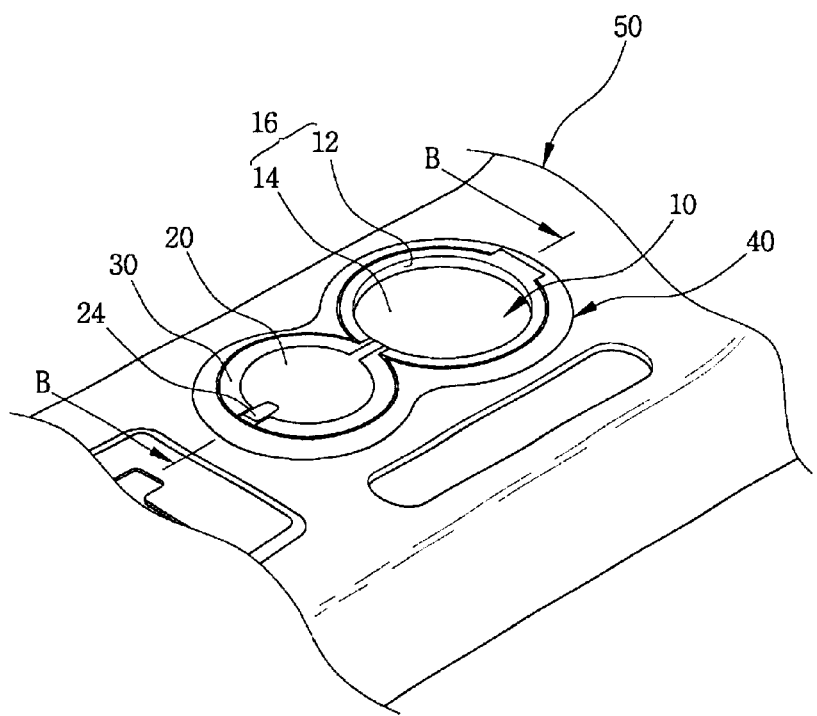
FIG. 4 is a perspective view of the first and the second cover and a ring cover of the cup holder in a closed state.

In order to selectively open or close an inner space 110 of housing 100 with covers 36 in accordance with the presence or absence of a beverage cup, as shown in FIG. 4, the covers 36 comprise the first cover 10, the second cover 20 and the ring cover 30. The second cover 20 and the ring cover 30 are pivotally mounted to a front end of the first retaining recess 44 by a hinge mechanism 92, all of which are rotatably connected at a common axis of the hinge mechanism 92. The first cover 10 is pivotally mounted to the front end of the first retaining recess 44 by the hinge mechanism 92.

Figure 5:
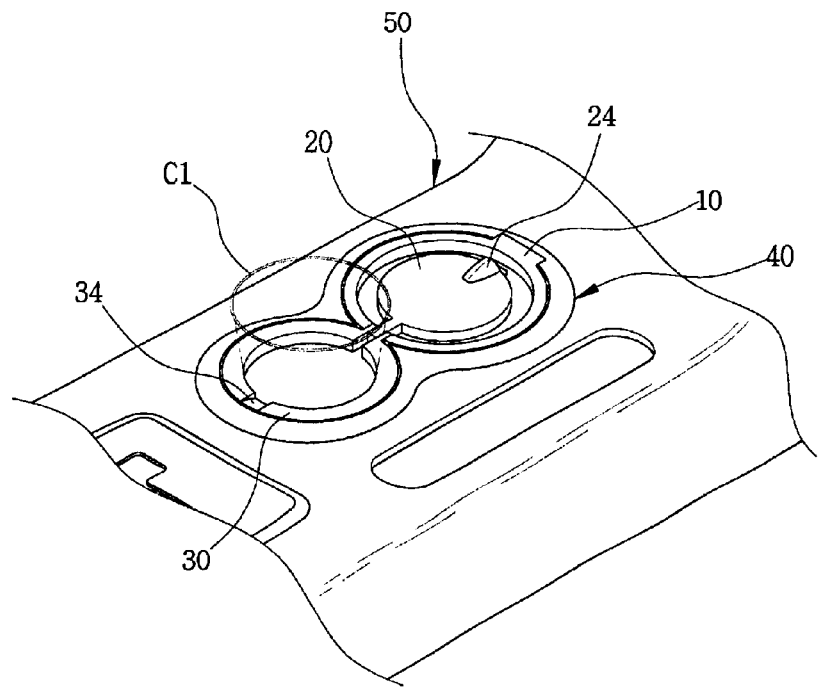
FIG. 5 is a perspective view of the second cover of the cup holder in an open state.

As best seen in FIG. 5, a handle 24 that serves to lift the second cover 20 is preferably integrally formed at one side of an upper surface of the second cover 20. Furthermore, a handle-receiving groove 34 is formed at one side of an upper surface of the ring cover 30. The handle 24 may be positioned in the handle-receiving groove 34 at the time that the second cover 20 is engaged with the ring cover 30. Accordingly, upper surfaces of the first and the second covers 20, 30 become a single smooth surface together.

Figure 6:
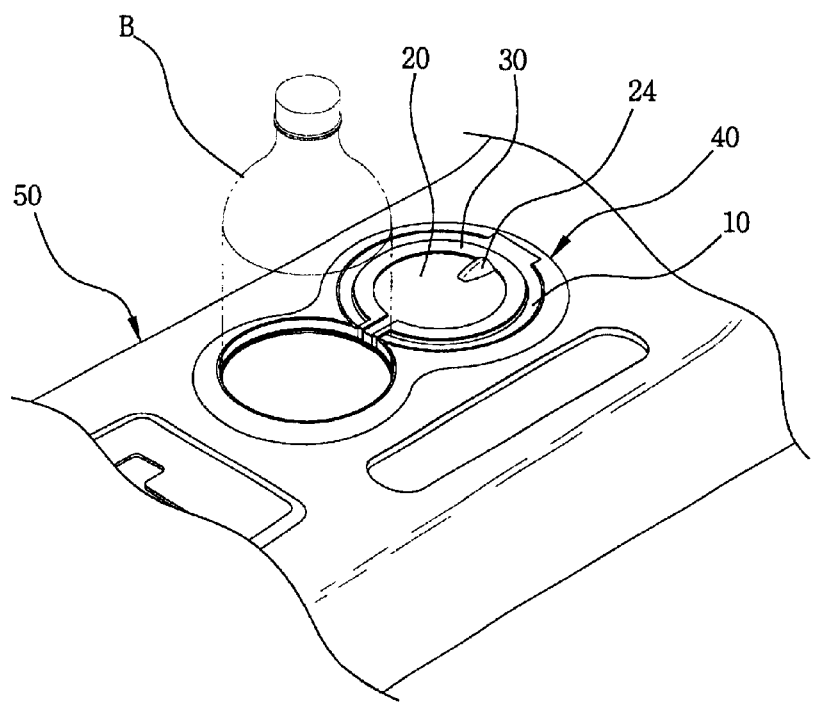
FIG. 6 is a perspective view of the second cover and the ring cover of the cup holder in an open state.

As best seen in FIG. 6, a cover-retaining depression 16 is formed at an upper portion of the first cover 10. When the second cover 20 and the ring cover 30 are open and continuously they are inserted into the cover-retaining depression 16, upper surfaces of the first 10 and the second covers 20 and the ring cover 30 become a single smooth surface together. Accordingly, it is possible to provide the cup holder with a good appearance during insertion of a cup or a can into the second retaining recess 42.

Figure 7:
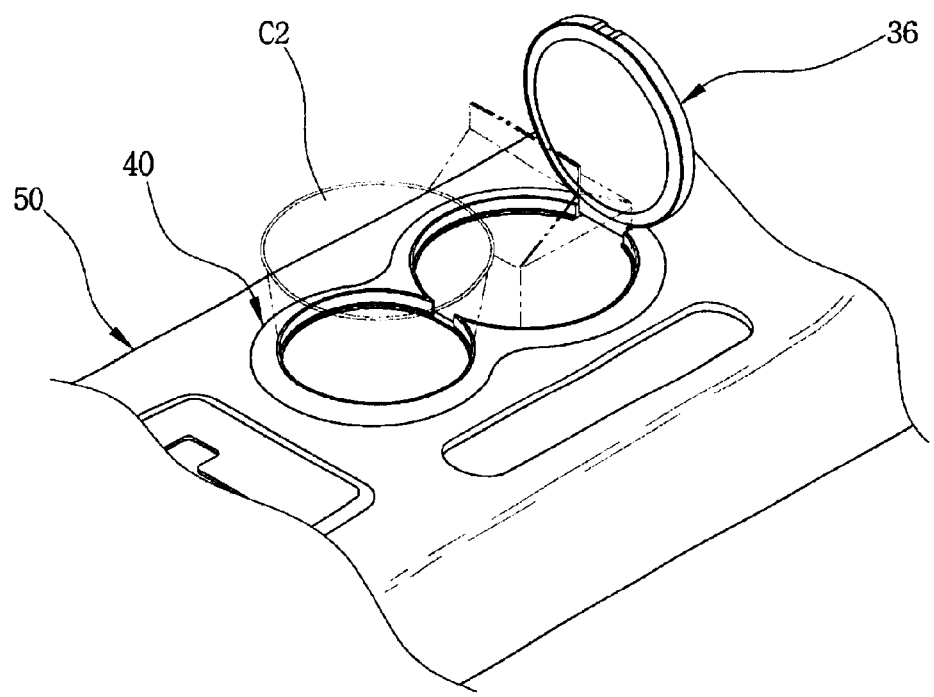
FIG. 7 is a perspective view of the first and the second cover and the ring cover of the cup holder than in an open state.

As best seen in FIG. 7, when a user wants to insert a beverage cup and a milk pack into the second retaining recess 42 and the first retaining recess 44 together, the second cover 20 and the ring cover 30 are rotated about the hinge mechanism 90 and then inserted into the cover retaining depression 16. Thereafter, they are rotated about the hinge mechanism 92 installed at the front end of the first retaining recess 44 and then open.

Figure 8:
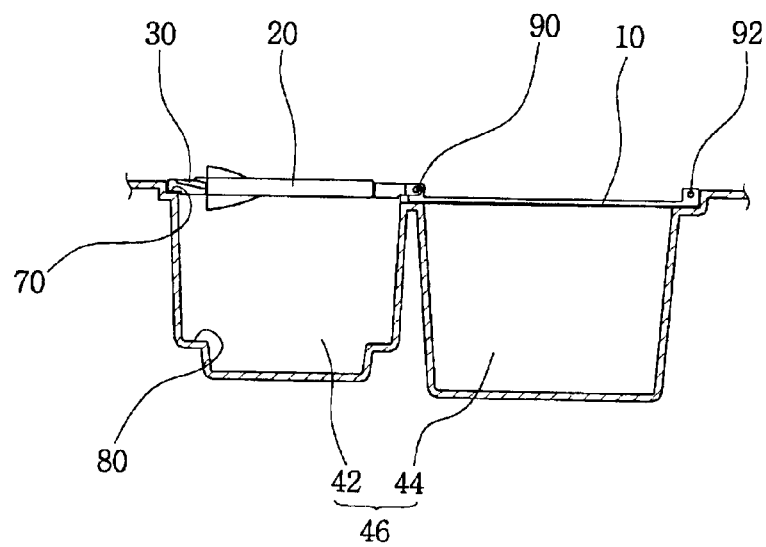
FIG. 8 is a sectional view taken along line B'—B' of FIG. 4.

As shown in FIG. 8, the housing 100 is embodied as overturned conical shapes. Accordingly, the retaining recess 46 tapers down over its diameter from its upper portion to its lower portion, respectively. When the covers 36 close the retaining recess 46, the bottom portion of the covers 36 is contacted with the locking step 70 and thereby the covers 36 cannot be pushed into the housing 100. After closing the retaining recess 46 by the covers 36, the upper surfaces of the covers and the console become a single smooth surface together.

Hereinafter, the cup holder for the automobile according to another embodiment of the present invention will be explained. As shown in FIG. 4, when a user does not want to use the retaining recess 46, the first cover 10 closes the first retaining recess 44 and the second retaining recess 42 is closed by the second cover 20 and the ring cover 30. The upper surfaces of the first, the second and the ring covers become a single smooth surface together.

Referring to FIG. 5, when a user wants to hold a small cup(C1), it is possible to insert the small cup(C1) into the second retaining recess 42 after opening the second retaining recess 42 by only lifting the second cover 20. The second cover 20 is snugly inserted into the cover retaining depression 16 formed at the first cover 10 so that it is possible to provide a good appearance.

Referring to FIG. 6, when a user wants to hold a bottle(B), it is possible to insert the bottle(B) into the second retaining recess 42 after opening the second retaining recess 42 by lifting the second cover 20 and the ring cover 30. The second cover 20 and the ring cover 30 are snugly inserted into the cover retaining depression 16 formed at the first cover 10 so that it is possible to provide a good appearance.

Referring to FIG. 7, in order to hold a large cup (C2) and a milk pack, the second cover 20 and the ring cover 30 covering the second retaining recess 42 are open and engaged in the cover retaining depression 16. Thereafter, the second cover 20 and the ring cover 30 positioned in the cover retaining depression 16 are rotated about the hinge mechanism 92 installed at the front end of the first retaining recess 44 and then open. As a result, it is possible to hold the large cup(C2) and the milk pack in the first and the second retaining recesses 44, 42.

As described herein, cup holders for use in an automobile according to embodiments of the present invention are provided with simple combining structures of which a circle cover and ring shaped covers are pivoted around a hinge mechanism. Accordingly, it is possible to reduce a manufacturing cost of the cup holder.

In addition, it is possible to cut the weight of the cup holder by one third relative to the conventional cup holder in case of employing plastic materials for manufacturing the covers. Additionally, there is no necessity for employing additional guides in order to hold a cup or a can. When a small can or a small cup is retained in this cup holder, it is possible to prevent it from being damaged and to independently use the retaining groove. By providing the user with a new type of cup holder, it is possible to grow a purchasing power.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A cup holder configured and dimensioned to be installed in a console of the automobile, comprising a pair of retaining recesses configured to hold a cup for drink formed in the console, said retaining recesses being opened and closed by a plurality of covers, a second of said retaining recesses being opened and closed by a second cover and a ring cover, a first of said retaining recesses being opened and closed by a first and the second covers and the ring cover integrally combined together, wherein the second cover and the ring cover are pivotally mounted to a front end of the first retaining recess by a hinge mechanism, all of which are rotatably connected at a common axis of the hinge mechanism.

2. The cup holder for an automobile according to claim 1, wherein the second cover is placed concentrically inside the ring cover for independent opening and closing of the second retaining recess.

3. The cup holder for an automobile according to claim 1, wherein a handle to lift the second cover is integrally formed at one side of an upper surface of the second cover, and a handle-receiving groove is formed at one side of an upper surface of the ring cover.

4. The cup holder for an automobile according to claim 1, wherein locking steps are formed at upper ends of the retaining recess so that the plurality of covers contact the locking steps on a bottom surface, thereby upper surfaces of the pluralities of covers are level with an upper surface of the console.

5. The cup holder for an automobile according to claim 1, wherein a supporting step is formed at an inner lower portion of the second retaining recess so that cups or cans having different diameters may be received in the second retaining recess.

6. The cup holder for an automobile according to claim 1, wherein a cover retaining depression is formed at an upper portion of the first cover such that when the second cover and the ring cover are open they are inserted into the cover retaining recess and thereby upper surfaces of the first and the second covers and the ring cover become a single smooth surface together.

7. An automobile cup holder, comprising:

- a housing defining first and second cup-shaped recesses with a wall portion between said recesses;
- a first cover for said first recess hinged to the housing opposite said wall portion;
- a second cover hinged to said wall portion; and
- a ring-shaped cover hinged to said wall portion with an open center configured and dimensioned to receive said second cover, the second and ring covers being configured to cover either the first or second recess.

8. The cup holder of claim 7, wherein said housing defines a peripheral step around each recess configured to receive said covers flush with an upper, outer surface of said housing.

\* \* \* \* \*